Dec. 29, 1964   N. G. M. TUCK ETAL   3,163,508
METHOD AND APPARATUS FOR SEPARATING GAS FROM LIQUID RICH
FOAMS OR LIQUIDS CONTAINING ENTRAINED AIR
Filed Feb. 2, 1961                                 2 Sheets-Sheet 1
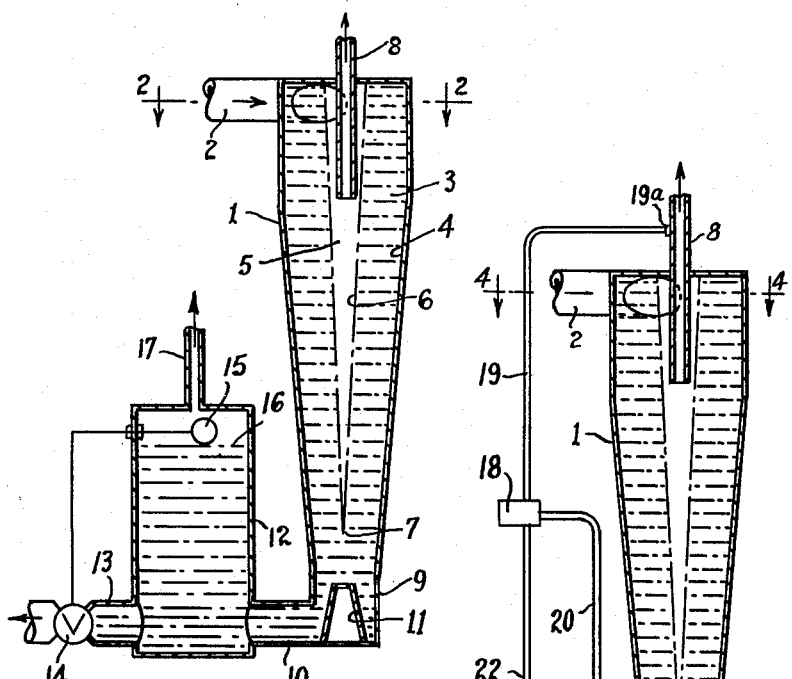
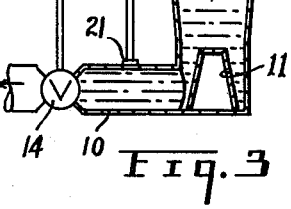
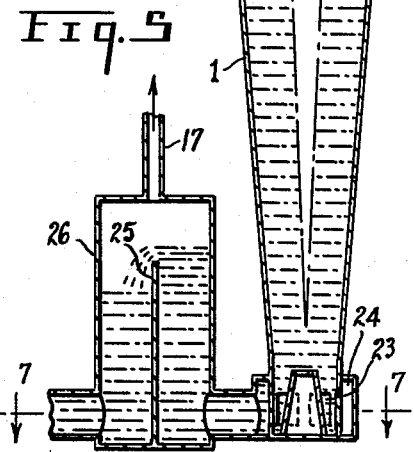
INVENTORS
N.G.M. TUCK
G.H. TOMLINSON II
BY Fetherstonhaugh & Co.
ATTORNEYS Dec. 29, 1964     N. G. M. TUCK ETAL     3,163,508
METHOD AND APPARATUS FOR SEPARATING GAS FROM LIQUID RICH
FOAMS OR LIQUIDS CONTAINING ENTRAINED AIR
Filed Feb. 2, 1961     2 Sheets-Sheet 2

INVENTORS
N.G.M. TUCK
G.H. TOMLINSON II

BY Fetherstonhaugh & Co.
ATTORNEYS

United States Patent Office 3,163,508
Patented Dec. 29, 1964

3,163,508
METHOD AND APPARATUS FOR SEPARATING GAS FROM LIQUID RICH FOAMS OR LIQUIDS CONTAINING ENTRAINED AIR
Norman Gordon Maxwell Tuck and George Herbert Tomlinson II, both of Cornwall, Ontario, Canada, assignors to Howard Smith Paper Mills Limited, Montreal, Quebec, Canada
Filed Feb. 2, 1961, Ser. No. 86,801
Claims priority, application Canada Sept. 7, 1960
12 Claims. (Cl. 55—46)

This invention relates to a method and apparatus for separating the gas component from the liquid component in liquid rich foams or liquids containing entrained air.

Foam forms when bubbles in a liquid do not coalesce even though this coalescence would result in a large decrease in surface area and is therefore energetically very probable. It is generally accepted that stable foams exist when the surface viscosity is high, thus inhibiting the motion of the gas particles, or when the surface tension of the external layers of the liquid film surrounding the bubble is considerably smaller than that of the bulk liquid. It is generally accepted that there are two main forces which tend to destroy foam bubbles, namely, surface tension and gravity. On the collapse of a bubble, the decrease in surface energy is:

$$=\Delta U_S = 8\pi R^2 v$$

and the decrease in gravitational energy is:

$$=\Delta U_g = 4\pi R^2 \delta \rho g$$

where,

R is the radius of the bubble,
$v$ is the surface tension,
$\delta$ is the thickness of the liquid layer around the bubble,
$\rho$ is the difference in density between the liquid and the gas,
$g$ is the acceleration due to gravity.

Of these two, the decrease in surface energy is normally the more important, and as noted above, a foam may become stable as a result of the surface tension of the film surrounding the bubble being smaller than that of the bulk liquid. Consequently, gravity alone is not considered to be effective in breaking foam and its contribution is restricted to causing the bubble to rise to the surface of the liquid and then draining the liquid from the film surrounding the bubble. The actual disruption of the bubble is due to mechanical disturbances or to changes in composition of the liquid film. Consequently, it is customary on stable foams to employ either the addition of chemical compounds to alter the surface tension of the film or mechanical devices to disrupt the foam. These mechanical devices have been many and varied consisting of "pulsating streams of gas above the liquid, perforated spiral canals, centrifuges, continuous pumping of liquid from bottom to top of container, change in pressure, heating elements, ultraviolet rays, X-rays, supersonic waves, rotating fans or disks or adjustable gratings above the liquid surface, sharp corners in the design of the apparatus, etc."

An example of a persistent gas-liquid system is that formed when air is entrained in the "black liquor" from the kraft wood-pulping process. The black liquor contains the organic materials which are dissolved from the wood by the alkaline cooking liquor and includes lignin derivatives, tall oils and soaps. If paper pulp fibres are also present, the foam becomes attached to the fibres and a particularly tenacious three component system can be encountered. The occurrence of foam is not an infrequent or unusual event, but is a direct consequence of the nature of the material and the processing equipment. For instance, after digestion of the wood is complete, the mixture of pulp fibres and the black liquor is passed through vibrating screens to remove the knots and undefibred chips. This introduces air in the liquor-pulp suspension. Again, when black liquor is removed from the pulp fibres on vacuum filters and the pulps washed to remove the residual chemicals, air is unavoidably mixed in with the black liquor filtrate. Conventionally, foam control in the kraft pulping process is attempted by a combination of chemical additives and the use of mechanical equipment, usually large settling tanks fitted with foam beaters. Since flow rates in excess of 2000 gallons per minute are not uncommon, huge settling tanks are necessary to obtain reasonable settling times and considerable power is required to operate the foam beaters on top of the settling tanks.

The present invention provides a novel method of mechanically breaking down and de-aerating a persistent foaming liquid effectively, simply and continuously and separating the two components into separate streams in such a way as to prevent their re-mixing.

This invention further provides a simple and effective apparatus for carrying out the new method, and, many applications without the expenditure of additional energy. This apparatus further is inherently flexible in that it is effective on various types of foams over a wide range of liquid to gas concentrations and is relatively pressure insensitive to quite wide changes in volumetric throughout.

According to the present invention, the foam or aerated liquid is broken down by the forces obtained in a vortex and the gas and liquid components are separated into individual streams by centrifugal force and then removed under conditions which do not permit gas re-entrainment.

More particularly, the foam or aerated liquid is tangentially injected into a separating chamber or circular cross-section so that it spirals inwardly and downwardly establishing a vortex. The centrifugal force established by virtue of the liquid rotating is many times greater than that due to gravity so that it enhances the rate of movement of the bubbles through the liquid and the drainage of liquid from the air bubbles. This accelerated separation of the gas and liquid components, coupled with the mechanical distortion of the bubbles due to successive layers of the fluid moving at different angular velocities, disrupts the bubbles. The gas component collects along the axis of rotation where appropriate means are provided for its removal. The liquid component travels toward the wall and thence downward where it is removed from the periphery of the separating chamber.

The separating chamber is radially symmetrical and is fitted with a relatively small axially located gas discharge at the top end, one or more tangentially fitted feed passages located near the top end and one or more suitable discharge passages at the lower end.

The apparatus of the present invention not only separates the aerated liquid into two components, the gas at the axis of rotation of the vortex and the liquid at the periphery of the vortex but also provides separate means for discharging the two components in such a way that the liquid cannot re-entrain the separated gas. This has not been the case with cyclones previously used for gas-liquid separations except those that discharge into evacuated chambers necessitating the use of vacuum pumps, vacuum legs, special seals, etc. For instance, in a gas cyclone designed for the elimination of small amounts of liquids from a gas, the gas is normally removed from a large opening at the top of the cyclone and the liquid component is eliminated as small particles or drops through the apex into a collection chamber. The gas phase is continuous down to, or possibly beyond, the apex of the cyclone, so there is intimate mixing of the gas and liquid components. If the liquid is one which has a tendency to foam, air will be re-entrained as it leaves the cyclone, though the gas being removed axially at the top end may be relatively free of liquid.

Likewise, in the operation of a liquid cyclone, as disclosed in U.S. Patent No. 2,878,934, normally a heavy component is removed with a small amount of the liquid at the apex and the main volume of liquid is removed axially from the large end. If a liquid containing entrained gas is treated in such a cyclone, both gas and liquid are normally removed from both discharge openings. The gas which is initially separated along the axis of rotation is re-entrained in the liquid as they leave the cyclone. As shown in the above mentioned patent it is possible to eliminate this gas re-entrainment by discharging into air tight receivers and evacuating one or both discharge receivers.

In the apparatus of the present invention, it is possible to obtain a foam-free liquid discharge without the application of vacuum by removing the liquid component from the periphery of the separating chamber under conditions such that the pressure on the peripheral discharge is higher than that on the liquid-free axial column. The apparatus fundamentally alters the flow pattern from that obtained in a liquid cyclone so that the gas column does not extend throughout the entire length but ends at a point above the dicharge outlet. The location at which this liquid-free axial column terminates towards the apex depends upon the inlet pressure, the pressure on the gas discharge line and on the liquid discharge line. This relationship can be simply controlled by discharging the liquid to a second vessel maintained at constant level above the liquid outlet of the separating chamber while maintaining the pressure on the gas phase of the two vessels approximately equal. Thus, if the gas component from the separating chamber discharges to atmosphere the second vessel should also be open to atmosphere. On the other hand, if for any reason, it is desired to discharge the gas component from the separating chamber under either vacuum or pressure, the gas phase above the liquid in the second chamber should be maintained at the same value by venting both chambers to a common source of vacuum or pressure.

Our invention will be further described in the reference to the accompanying drawings which serve to illustrate certain preferred embodiments of this invention.

FIG. 1 is a vertical sectional view, partly diagrammatic, of one of the preferred forms of the apparatus of the invention.

FIG. 3 is a vertical section similar to FIG. 1 illustrating a modified form of the invention utilizing a method of controlling pressure on the discharge line without the use of a second vessel.

FIG. 5 is a vertical section similar to FIG. 1 illustrating a further modified form of the invention having a slotted discharge chamber at the tangential outlet.

FIG. 8 is an enlarged vertical section of the lower end of the apparatus shown in FIG. 5 showing in detail the slotted discharge chamber.

Figure 2:
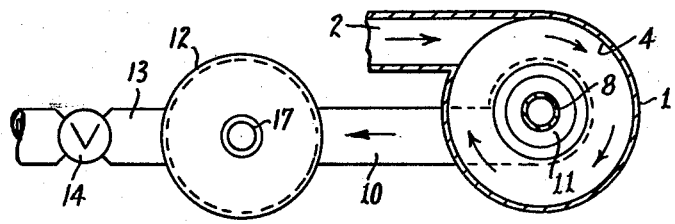
FIG. 2 is a horizontal section on an enlarged scale taken on the line 2—2 of FIG. 1.
Figure 4:
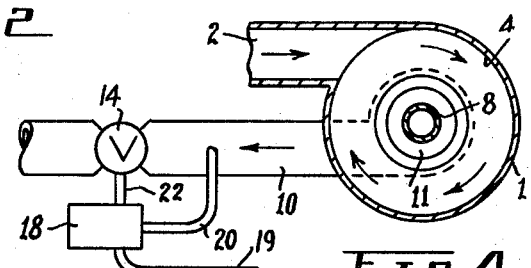
FIG. 4 is a horizontal section on an enlarged scale taken on the line 4—4 of FIG. 3.
Figure 6:
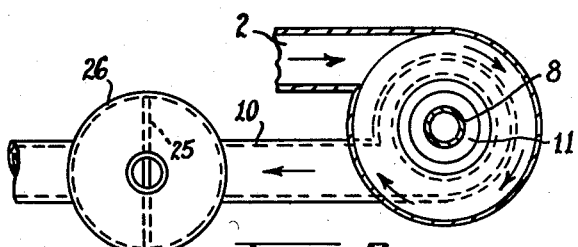
FIG. 6 is a horizontal section on an enlarged scale taken on the line 6—6 of FIG. 5.
Figure 7:
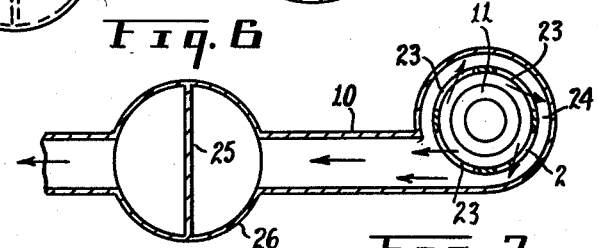
FIG. 7 is a horizontal section on an enlarged scale taken on the line 7—7 of FIG. 5.

In FIG. 1, the separating chamber 1 is shown as being cylindroconical. The tangential feed pipe 2 is placed near the top of the separating chamber 1 and serves for the introduction of the foam into the chamber so as to cause it to spiral inwardly and downwardly forming a vortex. The centrifugal force due to the rotating fluid 3 enhances the travel of the gas particles toward the axis of rotation and the drainage of the liquid from the film surrounding the bubble. This enhanced drainage, coupled with the distortion of the bubble due to the vortex motion, breaks the bubble. The centrifugal force causes the liquid to accumulate along the wall 4 of the separating chamber and a gas phase to collect in a central liquid free core 5 extending along the axis of rotation. A liquid gas interface 6 forms between the rotating liquid 3 and the gas column in core 5 and this terminates at point 7, the location of which will be controlled as shown later. The gas then discharges through the top axially located discharge pipe 8. The liquid travels down the wall 4 of the separating chamber to the discharge section 9 and then tangentially through the discharge pipe 10. The inverted truncated cone 11 serves the double purpose of eliminating eddy currents in the discharge section 9 and tends to stabilize the liquid free column 5 so that the latter is maintained in the axially centered position shown.

To ensure a gas-free liquid discharge, it is essential that the correct relative pressure on the discharge pipe 10 be maintained. This is automatically accomplished by discharging from pipe 10 into a second chamber 12 thence discharging to the next processing stage through pipe 13 and valve 14 linked to a constant level controller 15 to maintain liquid level 16 at a point above the top of outlet pipe 10. The liquid connections 10 and 13 to chamber 12 may be radially located. Vent pipe 17 is open to atmosphere if the gas discharge pipe 8 is open. Alternatively, if for any reason it is desirable to connect gas discharge pipe 8 to either a source of vacuum or pressure, vent pipe 17 should be subjected to the same pressure preferably by connecting to the same source of vacuum or pressure.

The specific dimensions found suitable for processing a suspension of air in black liquor from the kraft pulping process typical of that obtained from the pulp washer can best be described with reference to FIG. 1. The separating chamber 1 was cylindroconical with a maximum diameter of 12″ tapering at an included angle of 10 degrees to 6 inches diameter at the discharge section 9. The tangential feed pipe 2 was 3 inches in diameter, the gas discharge pipe 8 was 1½ inches in diameter and the liquid discharge pipe was 3¼ inches in diameter. The gas discharge pipe 8 and vent 17 were both open to atmosphere. The liquid level 16 in chamber 12 was maintained 24 inches above the top of the discharge pipe 10, which in turn caused the gas phase column to terminate at point 7 approximately 9 inches above the top of discharge pipe 10 and in turn prevented re-entrainment of air.

In FIG. 3 a modified form of the invention is illustrated. In this modified form, the vessel 12 has been eliminated and replaced by a control system whereby a constant pressure differential is maintained between the gas discharge pipe 8 and the liquid discharge pipe 10. This control system comprises a control device 18 having a connection 19 connected with the gas discharge pipe 8 through the pressure tap 19a. A second connection 20 leads from the control device 18 to a pressure tap 21 on the discharge pipe 10, and a third connection 22 leads to the valve 14.

In the modification illustrated in FIGS. 5 to 8, the lower end of the separation chamber 1 is provided with a series of slots or openings 23 and is surrounded by an annular chamber 24 to which the discharge pipe 10 is connected. In this modification the pressure in the system is maintained by a weir 25 in the second chamber 26. The openings 23 provide a tangential take-off near the bottom of the chamber 1 as shown by the arrows in FIG. 7.

Figure 9:
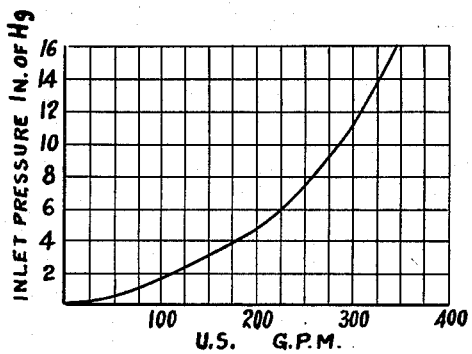
FIG. 9 is a typical curve of volumetric throughput of liquid as a function of inlet pressure.

FIG. 9 illustrates the relationship between the pressure at inlet 2 to the separating chamber 1 and the volumetric throughput of liquid when fed with an air-containing black liquor foam. At an inlet pressure of 6¼ inches of mercury, a discharge of foam-free black liquor of 225 gals. per minute was obtained at the peripheral discharge and a liquid free gas discharge was obtained at the axial discharge. Satisfactory separation was obtained at inlet pressures as low as 2 inches of mercury corresponding to about 2 feet head of liquor. Thus, by subjecting this foamy material, which will persist for hours when subjected to gravity alone, to centrifugal force, which was calculated to be five times that of gravity at the maximum diameter and to increase as the fluid spirals inwardly, the foam is completely disrupted in the five seconds required for a particle to pass through the foam breaker.

Foam breakers of the type described can be used on black liquor from the stock washers as part of the drop leg from the washer. In this way no additional energy is required to actuate the apparatus. The liquid discharge, being foam-free can be pumped or moved directly to the next processing stage eliminating the need for large settling tanks.

Another foam successfully treated consisted of a suspension of draft pulp in black liquid with entrained air similar to that fed to the stock washers when chemical defoamers are not used. This was separated into a foam-free suspension of pulp fibres in black liquor and a liquid-free gas component. For this purpose, the rotation chamber was cylindroconical with a maximum diameter of 12 inches tapering to a discharge section of 4 inches diameter. The feed inlet and liquid discharge pipes were both 2 inches diameter. The inlet pressure was 15 inches of mercury, the gas discharge was at atmospheric pressure and the liquid discharge pressure maintained by the level 16 in chamber 12 was 4¾ inches of mercury. Under these conditions, the capacity was 168 gallons per minute.

Obviously, parts of this apparatus can be altered in shape without adversely affecting its operation. For instance, the discharge section 9 which is shown as being cyclindrical in shape in FIG. 1 may be conical carrying the same angle as the walls of vessel 1. The discharge pipe 10 may be replaced by a multitude of pipes arranged along the periphery of the rotation chamber. Further discharge pipe 10 which is shown as fitting tangentially on the discharge section, may be fitted helically. The stabilizer 7 which is shown as being a truncated cone, may in fact be cylindrical or absent altogether. Alternatively, either weirs or any other device to maintain a positive pressure on discharge pipe 10 relative to the air column 5 may be used in place of the liquid level device shown in FIG. 1.

What we claim is:

1. A method of separating entrained gas from liquids in foams comprising continuously tangentially injecting the liquid into a conical chamber of circular cross-section so as to develop a body of liquid rotating throughout the length of the chamber and surrounding a central liquid-free column which forms a a result of the centrifugal force, moving the liquid inwardly and downwardly by means of restraining walls while the entrained gas moves inwardly radially as a result of its improved buoyancy in the increased gravitational field, removing the gas from an axially located outlet at the top of the chamber, the gas being removed from the gas outlet free of liquid, and removing all the gas-free liquid at the lower end from a liquid outlet while maintaining a pressure at the liquid outlet higher than that of the gas outlet to prevent re-entrainment of separated gas in the liquid.

2. A method of separating entrained gas from liquids in foams comprising continuously tangentially injecting the liquid into a conical chamber of circular cross-section so as to develop a body of liquid rotating throughout the length of the chamber and surrounding a central liquid-free column which forms a a result of the centrifugal force, moving the liquid inwardly and downwardly by means of restraining walls while the entrained gas moves inwardly radially as a result of its improved buoyancy in the increased gravitational field, removing the gas from an axially located outlet at the top of the chamber, the gas being removed from the gas outlet free of liquid, and removing all the gas-free liquid at the lower end from a liquid outlet while maintaining a pressure at the liquid outlet higher than that of the gas outlet so as to terminate the liquid-free column at a point above the top of the liquid outlet and thus prevent re-entrainment of separated gas in the liquid.

3. A method of separating entrained gas from liquids in foams comprising continuously tangentially injecting the liquid into a conical chamber of circular cross-section so as to develop a body of liquid rotating throughout the length of the chamber and surrounding a central liquid-free column which forms a a result of the centrifugal force, moving the liquid inwardly and downwardly by means of restraining walls while the entrained gas moves inwardly radially as a result of its improved buoyancy in the increased gravitational field, removing the gas from an axially located outlet at the top of the chamber, the gas being removed from the gas outlet free of liquid, and removing all the gas-free liquid as a tangential discharge at the lower end while maintaining a pressure at the liquid outlet higher than that of the gas outlet to prevent re-entrainment of separated gas in the liquid.

4. A method of separating entrained gas from liquids in foams comprising continuously tangentially injecting the liquid into a conical chamber of circular cross-section so as to develop a body of liquid rotating throughout the length of the chamber and surrounding a central liquid-free column which forms a a result of the centrifugal force, moving the liquid inwardly and downwardly by means of restraining walls while the entrained gas moves inwardly radially as a result of its improved buoyancy in the increased gravitational field, removing the gas from an axially located outlet at the top of the chamber, the gas being removed from the gas outlet free of liquid, and removing all the gas-free liquid as a tangential discharge at the lower end while maintaining a pressure at the liquid outlet higher than that of the gas outlet so as to terminate the liquid-free column at a point above the top of the liquid outlet and thus prevent re-entrainment of separated gas in the liquid.

5. A method of separating entrained gas from liquids in foams comprising continuously tangentially injecting the liquid into a conical chamber of circular cross-section so as to develop a body of liquid rotating throughout the length of the chamber and surrounding a central liquid-free column which forms as a result of the centrifugal force, moving the liquid inwardly and downwardly by means of restraining walls while the entrained gas moves inwardly radially as a result of its improved buoyancy in the increased gravitational field, removing the gas from an axially located outlet at the top of the chamber, the gas being removed from the gas outlet free of liquid, and removing all the gas-free liquid at the lower end from a peripherally located outlet into a second chamber, maintaining in said second chamber a level of liquid such as to maintain a pressure at the liquid outlet higher than that of the gas outlet to prevent re-entrainment of separated gas in the liquid.

6. A method of separating entrained gas from liquids in foams comprising continuously tangentially injecting the liquid into a conical chamber of circular cross-section so as to develop a body of liquid rotating throughout the length of the chamber and surrounding a central liquid-free column which forms as a result of the centrifugal force, moving the liquid inwardly and downwardly by means of restraining walls while the entrained gas moves inwardly radially as a result of its improved buoyancy in the increased gravitational field, removing the gas from an axially located outlet at the top of the chamber, the gas being removed from the gas outlet free of liquid, and removing all the gas-free liquid as a tangential discharge into an annular chamber and thence into a further chamber, maintaining a pressure within said chamber to exert a pressure at the liquid outlet higher than that of the gas outlet to prevent entrainment of separated gas in the liquid.

7. A method of separating entrained gas from liquids in foams comprising continuously tangentially injecting the liquid into a conical chamber of circular cross-section so as to develop a body of liquid rotating throughout the length of the chamber and surrounding a central liquid-free column which forms as a result of centrifugal force, moving the liquid inwardly and downwardly by means of restraining walls while the entrained gas moves inwardly radially as a result of its improved buoyancy in the increased gravitational field, removing the gas from an axial outlet at the top of the chamber, the gas being removed from the gas outlet free of liquid, maintaining the rotational flow of the gas-free liquid at the bottom of the chamber by means of an axial disposed conical surface and removing all the gas-free liquid as a tangential discharge at the lower end of the chamber into a second chamber, maintaining in said second chamber a level of liquid such as to maintain a pressure at the liquid outlet higher than that of the gas outlet to prevent re-entrainment of separated gas in the liquid.

8. In apparatus for separating entrained gas from liquids in foams, an inverted conical separating chamber having upper and lower end walls, a liquid free gas outlet axially disposed in said upper end wall and projecting downwards for a short distance into said separating chamber, a conical structure axially disposed on said lower end wall and projecting upwards into said chamber, a tangentially disposed foamed liquid inlet located at the upper end of said chamber to create a vortex therein, a gass-free liquid outlet at the lower end of said chamber located adjacent the lower end of said conical structure, and means to maintain a pressure at the liquid outlet higher than that of the gas outlet to extinguish the vortex at a point above said liquid outlet and to prevent re-entrainment of separated gas in the liquid.

9. In apparatus for separating entrained gas from liquids in foams, a hollow centrifugal separating chamber which comprises a short upper cylindrical portion and a lower cylindrical portion of smaller diameter than the upper portion, the peripheral walls of said upper and lower portions being joined by an elongated inverted conical portion, upper and lower end walls to said separating chamber, a liquid free gas outlet axially disposed in said upper end wall and projecting downwards into said chamber approximately the length of said upper cylindrical portion, a conical structure axially disposed on said lower end wall and projecting upwards into said chamber approximately the length of said lower cylindrical portion, a tangentially disposed foamed liquid inlet located at the upper end of said chamber to create a vortex therein, a gas free liquid outlet at the lower end of said chamber located adjacent the lower end of said conical structure, and means to maintain a pressure at the liquid outlet higher than that of the gas outlet to extinguish the vortex at a point above said liquid outlet and to prevent re-entrainment of separated gas in the inlet.

10. In apparatus as set forth in claim 8, in which the means for maintaining a pressure at the liquid outlet higher than at the gas outlet comprises a second chamber into which the liquid is discharged and means to maintain the level of liquid in the said second chamber at a level higher than that of the liquid outlet from the separating chamber.

11. In apparatus as set forth in claim 8, in which the means for maintaining a pressure at the liquid outlet higher than that at the gas outlet comprises a valve on the liquid outlet from the separating chamber and a control mechanism operating said valve, said control having pressure tap connections to said gas outlet and liquid outlet.

12. In apparatus for separating entrained gas from liquids in foams, an inverted conical separating chamber having upper and lower end walls, a liquid free gas outlet axially disposed in said upper end wall and projecting downwards for a short distance into said separating chamber, a conical structure axially disposed on said lower end wall and projecting upwards into said chamber, a tangentially disposed foamed liquid inlet located at the upper end of said chamber to create a vortex therein, an annular chamber about the lower end of said separating chamber and connected with the said separating chamber by a series of slots in the wall thereof, a tangentially disposed gas-free liquid outlet from said annular chamber and means to maintain a pressure at the liquid outlet higher than that of the gas outlet to extinguish the vortex at a point above said liquid outlet and to prevent re-entrainment of separated gas in the liquid.

References Cited in the file of this patent

UNITED STATES PATENTS

| 2,816,490 | Boadway et al. | Dec. 17, 1957 |
| 2,849,930 | Freeman et al. | Sept. 2, 1958 |
| 3,007,542 | Giampapa et al. | Nov. 7, 1961 |

FOREIGN PATENTS

| 588,344 | Canada | Dec. 8, 1959 |